Jan. 26, 1960  H. D. HOEKSTRA  2,922,982
TAKE-OFF SAFETY INDICATOR
Filed May 2, 1958  3 Sheets-Sheet 1

INVENTOR
Harold D. Hoekstra
BY Arthur Vinograd
ATTORNEY

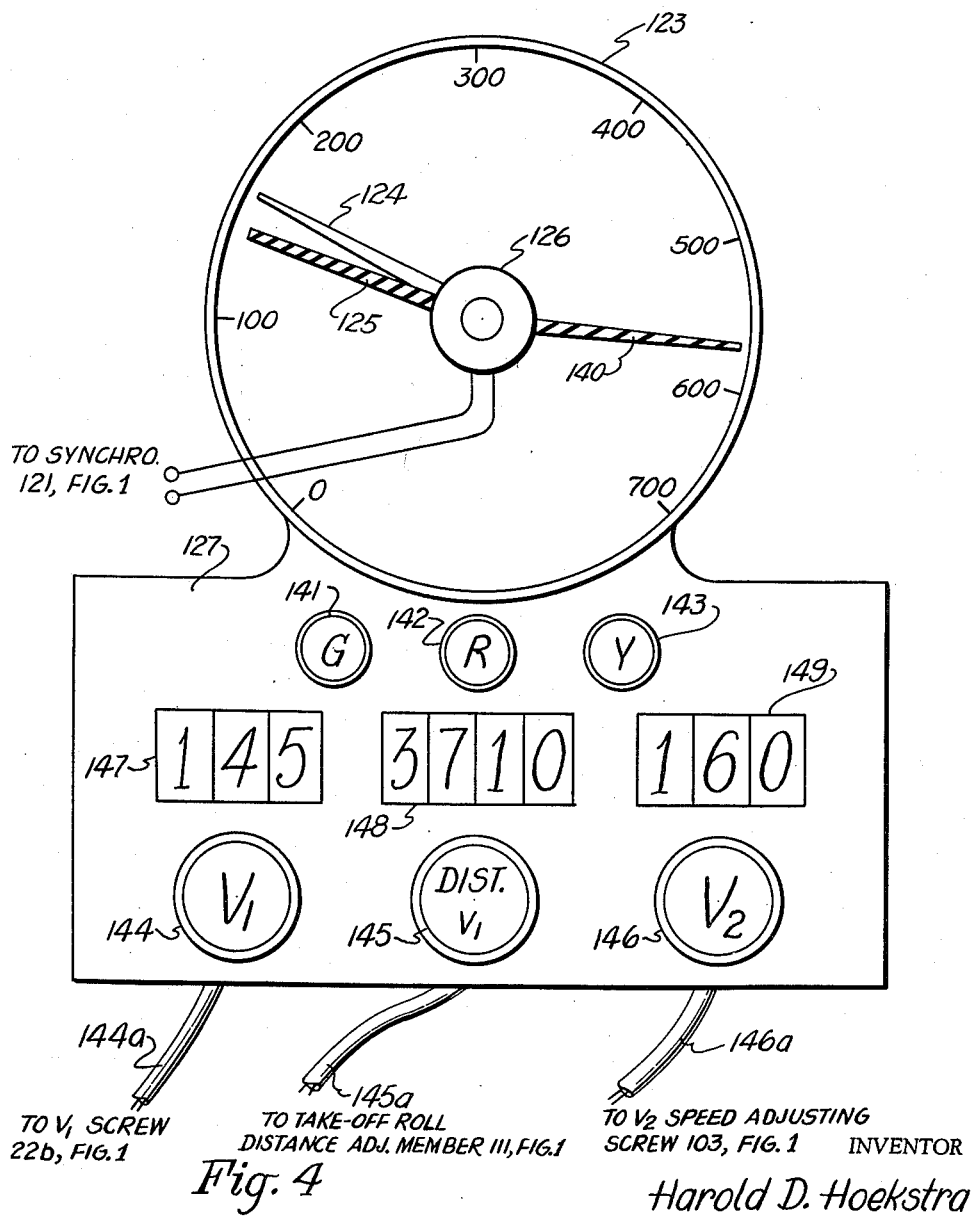

Jan. 26, 1960     H. D. HOEKSTRA     2,922,982
TAKE-OFF SAFETY INDICATOR

Filed May 2, 1958     3 Sheets-Sheet 3

FOR TAKE OFF     FOR LIMITING AIRSPEED

INVENTOR
Harold D. Hoekstra
BY
Arthur Vinogrado
ATTORNEY

United States Patent Office 2,922,982
Patented Jan. 26, 1960

2,922,982

TAKE-OFF SAFETY INDICATOR

Harold D. Hoekstra, Arlington, Va.

Application May 2, 1958, Serial No. 732,755

6 Claims. (Cl. 340—27)

(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952) Section 266.

The present invention relates to instruments for facilitating determination of the safe take-off speed of an airplane.

The present invention is an improvement on features previously disclosed and claimed in applicant's copending U.S. patent application, Serial No. 673,746, filed on July 23, 1957, and is a continuation-in-part thereof.

As fully described in the above copending application, means are provided for automatically and continuously correlating the air speed of an airplane at any particular instant during take-off roll with the airplane's position on the runway and for comparing such data with the known predetermined take-off characteristics of the airplane.

Referring briefly to Fig. 1 of the drawings, the invention as disclosed in applicant's copending application comprises a function card 40 having two electrically conductive areas 41 and 43, respectively. The separation between such two areas defines a curve 42 which is a plot of the velocity versus take-off roll distance characteristics of a particular plane type. Such plot is precomputed and is obtained from actual tests and computations involving factors such as atmospheric density, pressure and temperature, weight, power, rolling resistance, etc.

As completely disclosed in the copending application, the area 41 on the function card 40 represents more-than-safe conditions for take-off, the area 43 below curve 42 represents less-than-safe take-off conditions while the curve 42 represents minimum safe take-off conditions. Means are provided for displacing the function card 40 relative to a reading station along its abscissa to represent the advance of the airplane along the runway during take-off roll, while an electrical sensing arm such as 25 representing the reading station is displaced along the ordinate direction of the card in accordance with the measured air speed of the airplane. The arm 25 will therefore continuously sense whether minimum, more-than- or less-than-safe take-off conditions prevail, so that the pilot will be aware of whether a safe take-off can be made before the point-of-no-return.

The present invention is directed to improvements in the mechanism described in the copending application and particularly contemplates an improved indicating means for manifesting take-off conditions, and take-off roll distance measuring means of greater accuracy than is employed in the structure of the copending application.

In the copending application above-referred-to, a system of lights or signals is disclosed to indicate safe, more-than-safe and less-than-safe take-off conditions. From experience, it has been determined that pilots prefer a quantitative indicating system; that is, one that continuously manifests the exact values of a specific condition rather than an absolute "go"-"no go" system of signaling. When a quantitative system of manifestation is employed, the rate of approach to a limit may be evaluated by the pilot and corrective steps are more readily implemented.

In accordance with the principles of the present invention therefore, a minimum runway speed hand is provided on the conventional air speed indicator of the aircraft so that there is continuously made available the predetermined speed of the airplane during take-off roll.

As described in applicant's copending application, the landing gear of the airplane is employed to measure the displacement of the airplane along the runway during its take-off roll. Since close limits of accuracy on distance measurements are essential for determining optimum safe take-off conditions, it is imperative to accurately control the rolling radius of the wheel-tire combination comprising the landing gear. As is obvious, weight variations in the plane will cause corresponding variations in the rolling radius of the wheel-tire combination. Tires are generally inflated to a 35% deflection of the tire cross-section, a value which provides a specific rolling radius. For example, in the case of a typical jet transport 17.00—20-inch, 20-ply tire inflated to 120 lbs./square inch, the rolling radius will be 19.9 inches when the static load of the airplane is 32,000 pounds. If the same aircraft were to take off with minimum fuel and payload, the static load on the tire might be approximately 22,000 pounds and the rolling radius of the tire then becomes 20.8 inches. Therefore if the distance measuring means connected to the wheel-tire combination were set for a maximum load condition, it would register about 4.5% less than the true distance traversed during take-off, with minimum payload.

The safe climb-out speed $V_2$ referred to in the copending application represents the minimum velocity a plane having a given loading must attain upon completing its take-off roll in order to attain a proper or safe rate of climb. Such climb-out speed $V_2$ varies in a direct proportion with the airplane load. Since, as above pointed out, the effective rolling radius of the landing gear tire varies inversely with the airplane load, it can be shown that the rolling radius of the tire increases about one-third as rapidly as the $V_2$ speed decreases. The present invention accordingly provides means correlating the $V_2$ speed adjustment mechanism with the take-off roll registering means in order to compensate for variation between rolling radius change and airplane load.

Since variations in tire pressure, tread wear, differences in tread etc., also have an effect on the accuracy of the take-off roll distance measured by the landing gear, it will be obvious that the present invention is also readily adaptable for compensating such factors.

In addition, in some types of aircraft, the load on the tire may decrease with increase of airplane speed during take-off roll due to the effect of wing lift. The present invention therefore also includes means to compensate for the increased rolling radius of the landing gear resulting from wing lift.

The above objects and other objects to which reference will be made in the ensuing disclosure, are accomplished by a combination and arrangement of elements and instrumentalities of which a preferred embodiment is illustrated in the accompanying drawings in which:

Fig. 4 shows a conventional air speed indicator modified to incorporate an additional minimum safe take-off speed indicating means in accordance with the principles of the present invention;

Figure 1:
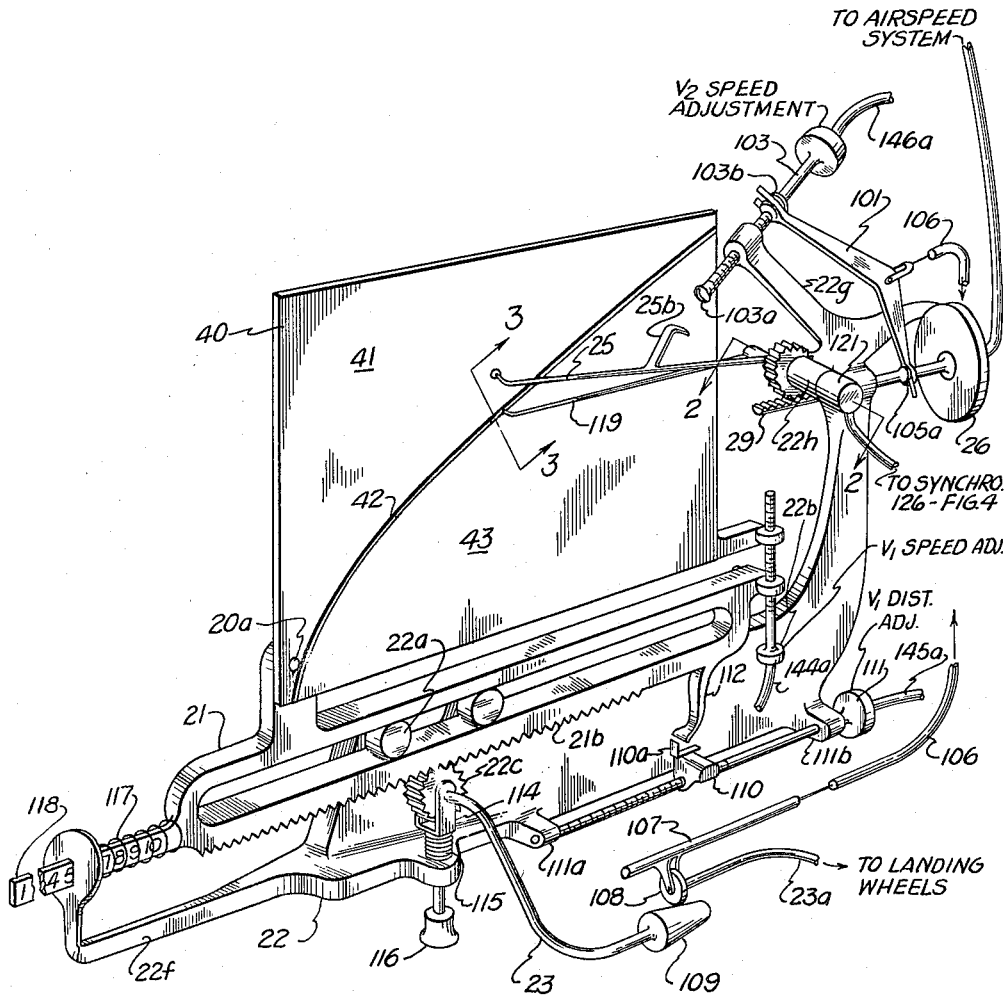
Fig. 1 is a schematic view showing an embodiment of the invention.

Referring to Fig. 1 of the drawings, the basic mechanism disclosed in copending application Serial No. 673,746 is shown together with the improvements comprising the present invention. As described in the copending application, the take-off safety indicator comprises a function card 40 having electrically conductive areas 41 and 43 corresponding to more-than-safe and less-than-safe take-off conditions respectively. The curve 42 defined by the intersection of such areas is a characteristic curve for the particular aircraft on which the instrument of the present invention is mounted. The curve 42 represents velocity as an ordinate, and take-off roll distance as an abscissa. In the present invention the curve 42 is embodied as a slot or groove between the two conducting areas 41 and 43 as is more clearly shown in Fig. 3. Such slot provides a guide for an additional sensing finger 119 which is mounted coaxially with the sensing finger 25 described in the copending application which scans the areas 41 and 43.

The function card 40 is pivotally mounted by means of pin 20a on a take-off roll register 21 similar to the construction in the copending application. The take-off roll register is slidably mounted by means of guide rollers 22a on support 22. A rack and pinion drive 21b, 22c is provided to translate the take-off roll register in accordance with the movement of the aircraft along the runway during take-off roll. In the movement of the aircraft along the runway during take-off roll, the highest speed from which it can be safely decelerated to a stop within the remaining runway length is defined as the $V_1$ speed, and the distance from the start of the take-off roll to the point where the said $V_1$ speed is attained is defined as the $V_1$ distance. As described in the copending application, a $V_1$ speed adjusting screw 22b is provided to tilt the card 40 about axis 20a so as to effectively change the characteristic of curve 42.

In accordance with the improvements provided by the present invention, the means for displacing the register 21 relative to the sensing means 25 in accordance with the measured roll of the aircraft includes special compensating linkages such as the variable speed drive 107—109 symbolically shown in Fig. 1, the linkage 101, and push-pull cable 106. Specifically, the flexible cable 23a connected to the landing gear wheels of the aircraft is connected to a roller 108 mounted in a shiftable frame 107 of the variable speed mechanism. The roller 108 in turn engages a tapered drum 109 which is drivingly connected to pinion 22c through cable 23. Frame 107 can be shifted to displace roller 108 relative to the tapered drum to provide different drive ratios between the landing gear and pinion 22c. The frame 107 can be shifted by the displacement of a differential linkage 101 acting through cable 106 as will be described.

In accordance with the principles of the present invention the support 22 is provided with an upwardly extending arm or bracket 22g. A portion of the arm 22g threadingly carries a $V_2$ speed adjusting screw 103 having a control knob and torsion shaft 146a.

The $V_2$ adjusting screw 103 is provided with an electrically conductive tip 103a and an integral collar 103b. The collar 103b is engaged by one end of a differential link 101. The other end of differential link 101 similarly engages a collar 105a on the air speed rack 29. The previously-referred-to push-pull cable 106 connects the medial portion of differential link 101 to the shiftable frame 107 of the variable speed mechanism 107—109.

The air speed rack 29 is displaced by the aneroid member 26 connected to the conventional air speed measuring system in the airplane similar to the manner described in the copending application.

It will be apparent from the above-described construction that adjustment of either the $V_2$ speed control member 103 or a variation in the air speed measuring member 29 or both will cause a differential displacement of the variable speed drive frame 107 and thereby vary the ratio between the displacement of register 21 and the landing wheels.

The drum 109 of the variable speed drive mechanism in turn displaces the register member 21 through pinion 22c to translate the function card 40 in an abscissal direction relative to arm 25 as the plane moves during take-off roll. A disconnect knob 116 acting through frame 114 against a spring 115 is provided to disconnect the pinion 22c from rack 21b in order to permit resetting of the register 21 and function card to a zero position. The register 21 is provided with a distance indicator 118 suitably marked for relation to index 22f and a register return spring 117.

Figure 5:
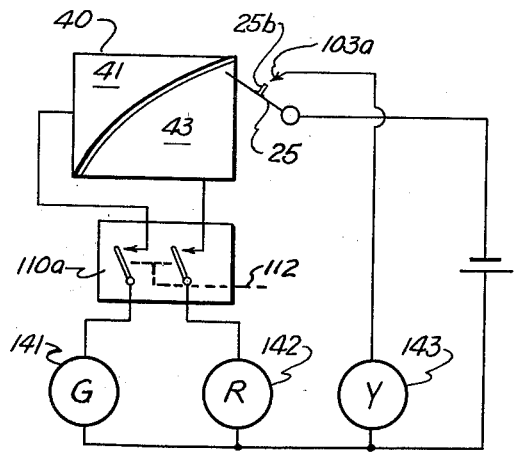
Fig. 5 is a schematic illustrating the electrical circuitry involved in the mechanism of Fig. 1.

Referring further to Fig. 1, support 22 is provided with a pair of lateral extensions 111a, 111b in which a take-off roll distance adjusting member 111 is mounted. Such adjusting member comprises a threaded shaft engageable with a nut 110. The nut 110 carries a $V_1$ distance cut-off switch 110a which may be in the form of a conventional, normally closed, double-pole switch as shown in Fig. 5. As is apparent from Fig. 1, the operating arm of cut-off switch 110a is adapted to be engaged by a trip arm 112 provided on the take-off roll register 21 for a purpose to be described.

Figure 2:
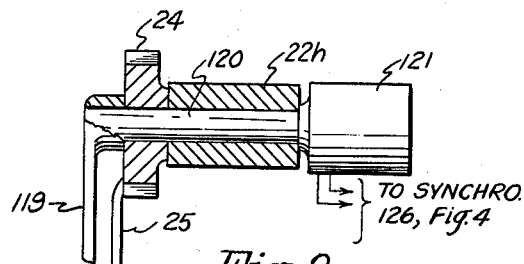
Fig. 2 is a sectional view taken on line 2—2 of Fig. 1.

Fig. 2 is a sectional view taken on line 2—2 of Fig. 1 and shows in greater detail the relation between card-sensing arm 25 described in connection with the copending application and the additional curve following arm 119. It will be noted from Fig. 2 that extension 22h of the support comprises a bearing portion in which there is journaled a shaft 120. Shaft 120 actuates a synchro 121 or other motion transmitting means and carries the referred-to curve following arm 119 identified in Fig. 1. Card-sensing arm 25, in turn is loosely mounted on shaft 120 by means of the pinion 24 which engages the air speed rack 29 shown in Fig. 1.

It will be apparent from such described construction that the card-sensing arm 25 and curve follower arm 119 are capable of independent motion relative to each other.

Figure 3:
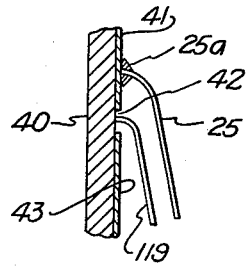
Fig. 3 is a sectional view taken on line 3—3 of Fig. 1.

Fig. 3 further illustrates the relation between arms 25 and 119. As is clearly shown in Fig. 3, the conductive tip of card-sensing arm 25 is adapted to contact either of the previously-identified, electrically-conductive areas 41, 43 on function card 40. A non-conductive rounded end collar 25a is fitted around the conductive tip of sensing arm 25 thereby allowing arm 25 to pass over slot 42 without dropping into it. The circuit connection for conducting tip 25a is shown in the electrical schematic of Fig. 5. As previously mentioned, curve 42 on the function card is in the form of a slot cut into the conducting surface of card 40. The non-conducting end of the arm 119 as is clearly shown in Fig. 3 fits within the slot 42 and therefore is forced to follow the curve as card 40 (see Fig. 1) is translated in an abscissal direction by pinion 22c.

Fig. 4 shows a conventional pilot's air speed indicator 123 which has been modified to incorporate features of the present invention. The indicator includes the usual air speed indicating hand 124 activated in a conventional manner by the air speed measuring instrument on the airplane, and the usual maximum limiting air speed hand 140 governed by impact pressure and mach considerations. In this invention an additional minimum take-off speed hand 125 is provided in front of the air speed dial and is mounted concentrically with the air speed hand 124. Specifically, the minimum take-off speed hand 125 is driven by a synchro 126 which is electrically coupled to synchro 121 (see Figs. 1 and 2) on shaft 120 carrying curve-following arm 119 described in connection with Fig. 2.

An additional panel 127 is provided below air speed dial 123 for housing the particular indicating means employed with the present invention. Specifically green, red, and yellow indicator lights 141, 142, and 143 are provided for indicating more-than-safe, less-than-safe, and minimum-safe take-off conditions as in the copending application.

In addition, adjustment knobs 144, 145, and 146 are provided. These knobs are respectively connected by conventional flexible cables 144a, 145a, and 146a to $V_1$ screw 22b, take-off roll distance adjusting member 111, and $V_2$ adjusting screw 103 described in connection with Fig. 1. Veeder-type counters 147, 148, and 149 are provided on panel 127 and are connected to be driven by the knobs 144, 145, andn 146 respectively to quantitatively indicate the $V_1$ speed, the $V_1$ distance and the $V_2$ speed erspectively.

Referring to Fig. 1, as function card 40 is translated to the left by the distance measuring means acting through pinion 22c and rack 21b, the predetermined speed-distance relationship established by groove 42 is transmitted by curve-follower arm 119 and shaft 120 (Fig. 2) to synchro 121. In Fig. 4, synchro 126 which is electrically coupled with synchro 121 reproduces the minimum take-off speed by displacing hand 125 on the modified air speed indicator 123. Such indication provides the pilot with direct, continuous and instantaneously correct information of the necessary air speed required for the take-off roll distance traversed, together with ready comparison with the actual air speed shown by hand 124.

The knobs 144, 145, and 146 provide ready means of setting the respective take-off data into the mechanism of the present invention. The Veeder counters 147, 148 and 149 provide means for ready verification of settings in the usual pre-take-off check by the flight crew.

Referring again to Fig. 1, adjustment of the $V_2$ speed screw 103 (through knob 146, Fig. 4) in a direction which moves contact 103a relative to the abutment 25b on card-sensing finger 25 will determine the interval in which the extension contact 25b on card-sensing arm 25 contacts the conducting portion 103a of the $V_2$ speed adjusting member. That is, the further to the left that contact 103a is displaced as viewed in Fig. 1, the lower will be the corresponding magnitude of the indicated $V_2$ speed.

Such adjustment of member 103 will also function to displace differential link 101 in a manner that will displace roller 108 of the variable speed mechanism toward the smaller diameter of cone 109. The resulting action will cause pinion 22c to rotate more rapidly and the displacement of the function card 40 in an abscissal direction will increase in proportion to each turn of the landing gear wheel.

In other words, when the instrument is adjusted for a lower $V_2$ climb-out speed, which is done only because of lower take-off weight, the instrument is automatically compensated for the increased roll radius consequent to such lessened weight as was described previously.

As previously indicated, the present invention also provides means for distance correction due to the effect of wing lift in reducing the true load on the wheels during take-off roll. As the aircraft increases speed during take-off roll, the consequent increase in air speed will be manifested by a commensurate displacement of air speed rack 29 shown in Fig. 1. As such rack is displaced to the left as viewed in Fig. 1 with increased air speed, the collar 105a on the rack will also displace differential member 101 to cause movement of carriage 107 of the variable speed member in a direction such that roller 108 contacts the smaller diameter of cone 109. Such action, in a manner similar to the reduction of the $V_2$ setting as described, causes the function card 40 to be displaced in an abscissal direction at an increased rate with respect to each turn of the landing wheel. Thus the effect of using lift due to increased air speed is employed to compensate for the increase in the rolling radius resulting from the reduced load on the tire.

The electrical circuit employed in the present improved embodiment is illustrated in Fig. 5. The card-sensing finger 25 together with its extension contact 25b is shown connected to one side of a potential source. The three indicator lights 141, 142, and 143 identified in connection with Fig. 4, and also forming part of the indicator in applicant's copending application, are connected in the circuit as indicated.

Specifically, the yellow indicator is connected to electrical contact 103a which, as described in connection with Fig. 1, is adjustably mounted relative to support 22 and arm 25 by the $V_2$ speed adjusting screw 103. The green indicator lamp 141 which indicates a more-than-safe take-off condition and the red indicator lamp 142 indicating a less-than-safe take-off condition are connected through the normally closed switch 110a to the conducting areas 41 and 43 respectively of function card 40. The operator 112 for the switch is indicated in broken lines in Fig. 5.

During the early stages of take-off roll, sensing finger 25 will contact either of the conducting areas 41 or 43 depending upon whether the velocity of the plane at any particular time is adequate or inadequate for the runway distance traversed. Switch 110a is normally closed. Therefore if sensing arm 25 is in contact with area 41, the green lamp 141 will be energized while if the arm 25 contacts area 43, the red light 142 will be energized.

The switch 110a will have previously been positioned by adjustable screw 111 to a predetermined position indicative of the proper selected $V_1$ distance; that is, the distance beyond which safe takeoff, for a particular airport cannot be attained unless the air speed of the aircraft corresponds to a point on function card 40 above curve 42. When such distance has been traversed, it will be clear from Fig. 1 that trip arm 112 forming part of take-off roll register 21 will activate, that is, open the normally closed switch 110a and deenergize the circuit for both the green and red indicator lamps 141 and 142.

As the air speed increases further, the air speed manifesting finger 25 will rotate sufficiently clockwise as viewed in Fig. 1 to cause extension contact 25b to touch adjustable contact 103a on the $V_2$ speed adjustment screw 103. Hence, yellow indicator light 143 will become energized indicating attainment of the safe take-off speed $V_2$.

Figure 6:
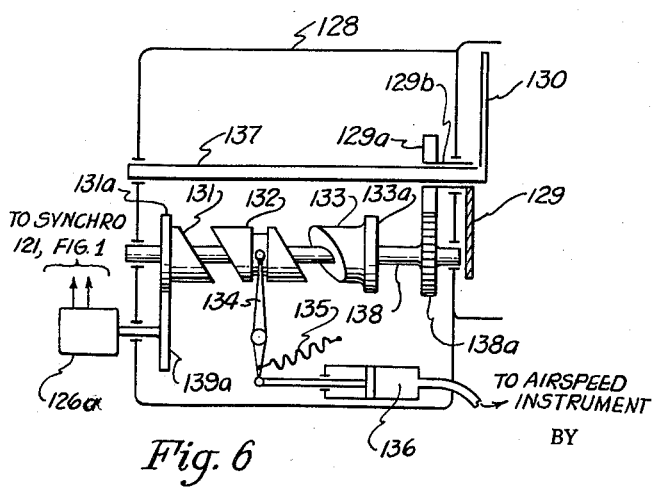
Fig. 6 shows a further modification in which a conventional air speed indicator is modified to combine the additional minimum speed indicating means of this invention with the usual maximum limiting air speed indicating means.

Fig. 6 shows a modification employed in order to further simplify the indicating means. In the mechanism of Fig. 6 an indicating hand 129 is provided which combines the functions of both the maximum speed hand 140 and take-off speed indicating hand 125 of Fig. 4. The air speed indicator 128 in the modification of Fig. 6 incorporates the usual air speed indicating hand 130 corresponding to hand 124 of Fig. 4 actuated by the conventional air speed measuring mechanism (not shown) through a shaft 137. A shaft 138 is provided which actuates the limit hand 129 corresponding to hand 140 of Fig. 4 through gears 138a and 129a. The gear 129a is provided with a collar 129b to which indicating hand 129 is affixed. A clutch 131—133 is provided to connect indicating hand 129, either to synchro 126a or to an air speed mach number limit information indicator (not shown) which may be applied through gear 133a. Clutch member 132 is splined to shaft 138. A tension spring 135 is provided to bias lever 134 in a counterclockwise direction as viewed in Fig. 6 causing clutch member 132 to drivingly engage with clutch member 131.

Clutch member 131 includes a gear 131a which is driven through gear 139a by the previously-described synchro 126a. In such position of the clutch the predetermined and preset take-off roll versus air speed relationship represented by curve 42 is transmitted by synchro 126a to indicating hand 129. An air speed responsive means which may be in the form of a piston and cylinder 136 as shown in Fig. 6 is pneumatically connected with the conventional air speed measuring device previously referred to. The piston is connected to clutch shifting lever 134. When an air speed corresponding to $V_1$ or higher is attained, the air speed impact pressure overcomes the force of spring 135, rotates lever 134 clockwise shifting clutch member 132 into engagement with clutch member 133. Since clutch member 133 is driven in accordance with limiting air speed mach numbers as described, in this position, the indicating hand 129 functions to register the limiting air speed-mach limits transmitted through gear 133a.

Figure 7:
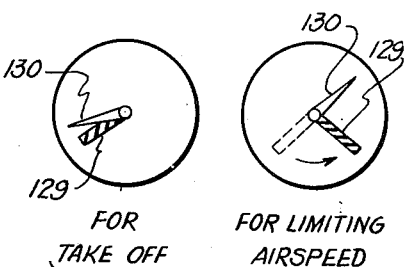
Fig. 7 illustrates the face of the air speed indicator of Fig. 6 showing the dual use of a limiting speed hand.

Fig. 7 illustrates the above two modes for the indicating hand 129 as viewed by the pilot.

It is important in an aircraft instrument that it be readily checked by the flight crew to insure that it is functioning properly. Fig. 1 indicates means to accomplish this. As the aircraft taxis from the ramp to the take-off point the distance measuring mechanism should function. Hence, roll register member 21 will be shifted to the left. Distance indicator 118 will then be translated relative to the reference end of index arm 22f. The crew can then visually observe the distance measured and compare it with reference points along the taxiway. Prior to take-off, pinion release 116 is pulled and spring 117 will return register member 21 to the zero distance point.

Alternatively, it is possible to use the minimum acceptable speed hand 125 as an indicator of distance.

As described above, taxiing the aircraft shifts member 21 to the left. Simultaneously hand 125 will move to an increasing speed value corresponding to the value established by curve 42 for the distance traversed.

Although the foregoing specification and drawings show the distance measuring and connecting devices co-operating with the landing gear, it is obvious that other means such as radar, inertial integration, etc. may be employed to measure the distance.

It is apparent that the means shown herein are only exemplary and that modifications can be made in construction and arrangement within the scope of the invention as defined in the appended claims.

What is claimed is:

1. A device for continuously correlating the speed of an airplane with take-off roll distance comprising: registering means, function generating means coacting with said registering means for generating predetermined values of air speed on the runway as a function of runway distance for minimum take-off speed, means responsive to the measured air speed of the airplane and cooperably related with said function generating means for comparing said generated runway air speed with said measured speed, means for displacing said registering means relative to said comparing means in accordance with the measured ground distance traversed by the airplane during take-off roll, said function generating means comprising a mechanized plot of the velocity-distance history of acceleration characterizing a particular airplane, curve follower means for tracking said mechanized plot as said register is displaced relative to said comparing means, an air speed indicator, auxiliary indicating means on said air speed indicator for indicating minimum take-off speeds and means for drving said auxiliary indicating means in synchronism with said curve follower means.

2. The invention of claim 1 in which said means for comparing said generated runway air speed and said measured speed values comprises an arm displaceable in accordance with measured air speed for sensing said mechanized plot, adjustable means adjustable in accordance with climb-out speed for limiting the displacement of said arm to a predetermined value and variable ratio driving means connected to said adjustable means and said register displacing means for selectively varying the displacement of said registering means relative to said comparing means in accordance with the setting of said adjustable means.

3. The invention of claim 2 including an indicator circuit and means connecting said comparing means and said adjustable means in said indicator circuit for manifesting contact between said latter means.

4. The invention of claim 2 including differential means connected respectively to said adjustable means and to means actuated by the measured air speed of the airplane and means connecting said differential means to said variable ratio driving means.

5. A device for continuously correlating the speed of an airplane with take-off roll distance comprising: registering means, function generating means coacting with said registering means for generating predetermined values of air speed on the runway as a function of runway distance for minimum take-off speed, means responsive to the measured air speed of the airplane and cooperably related with said function generating means for comparing said generated air speed with said measured speed, means for displacing said registering means relative to said comparing means in accordance with the measured ground distance traversed by the airplane during take-off roll, electrical indicating means connected to said comparing means for indicating the relation between said two defined speeds and means responsive to said registering means for deenergizing said electrical indicating means upon completion of a predetermined displacement of said registering means relative to said comparing means.

6. The invention of claim 1 including means responsive to the measured air speed of the aircraft for concurrently disconnecting said auxiliary indicating means from said driving means and displacing said indicating means in accordance with a function of measured air speed.

No references cited.